(12) United States Patent
Mikic et al.

(10) Patent No.: US 12,371,161 B2
(45) Date of Patent: Jul. 29, 2025

(54) MULTI-SEGMENT OBLIQUE FLYING WING AIRCRAFT

(71) Applicant: Joby Aero, Inc., Santa Cruz, CA (US)

(72) Inventors: Gregor Veble Mikic, Santa Cruz, CA (US); JoeBen Bevirt, Santa Cruz, CA (US); Benjamin John Brelje, Ann Arbor, MI (US)

( * ) Notice: Subject to any disclaimer, the term of this patent is extended or adjusted under 35 U.S.C. 154(b) by 0 days.

(21) Appl. No.: 18/765,217

(22) Filed: Jul. 6, 2024

(65) Prior Publication Data
US 2025/0042546 A1 Feb. 6, 2025

Related U.S. Application Data

(63) Continuation of application No. 18/070,417, filed on Nov. 28, 2022, now Pat. No. 12,049,312, which is a continuation of application No. 17/477,263, filed on Sep. 16, 2021, now Pat. No. 11,572,168.

(60) Provisional application No. 63/078,903, filed on Sep. 16, 2020.

(51) Int. Cl.
| | |
|---|---|
| *B64C 39/10* | (2006.01) |
| *B64C 3/10* | (2006.01) |
| *B64C 3/40* | (2006.01) |
| *B64C 29/00* | (2006.01) |
| *B64C 39/00* | (2023.01) |

(52) U.S. Cl.
CPC ............. *B64C 39/10* (2013.01); *B64C 3/10* (2013.01); *B64C 3/40* (2013.01); *B64C 29/0033* (2013.01); *B64C 39/029* (2020.01); *B64C 2039/105* (2013.01)

(58) Field of Classification Search
CPC .. B64C 39/10; B64C 3/10; B64C 3/40; B64C 29/0033; B64C 2039/105
See application file for complete search history.

(56) References Cited

U.S. PATENT DOCUMENTS

| | | | | |
|---|---|---|---|---|
| 3,820,743 | A * | 6/1974 | Young ................... | B64C 29/00 244/56 |
| 4,836,470 | A * | 6/1989 | Criswell ................. | B64C 39/10 244/159.3 |
| 6,745,979 | B1 * | 6/2004 | Chen ...................... | B64C 3/40 244/119 |
| 8,408,490 | B2 * | 4/2013 | McDonnell ............. | B64C 3/10 244/45 R |
| 9,878,788 | B2 * | 1/2018 | Blue ...................... | B64C 29/0075 |
| 10,435,137 | B2 * | 10/2019 | McDonnell ............. | B64C 39/10 |
| 2012/0037751 | A1 * | 2/2012 | Zha ........................ | B64C 23/072 244/52 |
| 2016/0375981 | A1 * | 12/2016 | McDonnell ............. | B64F 1/04 244/13 |

\* cited by examiner

*Primary Examiner* — Brian M O'Hara
(74) *Attorney, Agent, or Firm* — Michael A. Guth

(57) ABSTRACT

A multi-segment oblique flying wing aircraft which has three distinct segments including two outer wing segments and a central wing segment. The central segment may be thicker in the vertical direction and adapted to hold pilots and passengers. The outer wing segments may be substantially thinner and may taper as they progress outboard from the wing center. The multi-segment oblique flying wing aircraft be adapted for rotating into a high speed flight configuration, or may be adapted for take-off and cruise at a constant angle. In an extreme flight case, the central wing segment may rotate to a local sweep of ninety degrees.

19 Claims, 14 Drawing Sheets

MULTI-SEGMENT OBLIQUE FLYING WING AIRCRAFT

CROSS-REFERENCE TO RELATED APPLICATIONS

This application is a continuation of U.S. patent application Ser. No. 18/070,417 to Veble Mikic et al., filed Nov. 28, 2022, which is a continuation of U.S. patent application Ser. No. 17/477,263 to Veble Mikic et al., filed Sep. 16, 2021, which claims priority to U.S. Provisional Patent Application No. 63/078,903 to Veble Mikic et al., filed Sep. 16, 2020, which are hereby incorporated by reference in their entirety.

BACKGROUND

Field of the Invention

The present invention relates to aircraft, and more particularly to an aircraft with a multi-segment oblique wing design.

Description of Related Art

In 1958, R. T. Jones suggested that aircraft with asymmetrically-swept (oblique) wings would offer many advantages at high transonic and low supersonic speeds. There have been technical challenges associated with all-wing oblique wing configurations, in that such configurations lack the powerful stability and control contributions from traditional tails.

What is called for is an oblique wing aircraft which can support significant cargo and passenger payloads, while maintaining stability during high-speed flight.

SUMMARY OF THE INVENTION

A multi-segment oblique flying wing aircraft which has three distinct segments including two outer wing segments and a central wing segment. The central segment may be thicker in the vertical direction and adapted to hold pilots and passengers. The outer wing segments may be substantially thinner and may taper as they progress outboard from the wing center. The multi-segment oblique flying wing aircraft be adapted for rotating into a high-speed flight configuration, or may be adapted for take-off and cruise at a constant angle. In an extreme flight case, the central wing segment may rotate to a local sweep of ninety degrees.

DETAILED DESCRIPTION

High speed aircraft design requires balancing the design requirements for take-off and landing, and slower speed flight, with the design goals centered around high-speed flight, especially in transonic and supersonic speed regimes. Prior designs have included conventional, swept wing, aircraft, and oblique wing designs. An oblique wing arrangement distributes lift over about twice the wing length as a conventional swept wing of the same span and sweep, which provides a reduction in the wave component of lift-dependent drag in the supersonic speed regime by a factor of 4. For oblique flying wings of high aspect ratio, the supersonic volumetric wave drag is also favorable. An oblique flying wing can also prove to be a very efficient configuration in the high transonic speed regime.

Figure 1:
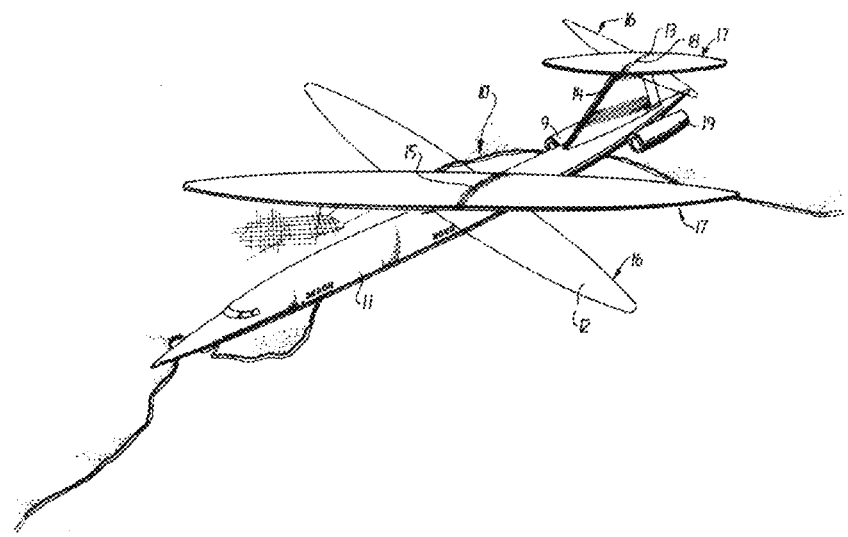
FIG. 1 is a view of a prior art aircraft with a rotatable wing.
Figure 2:
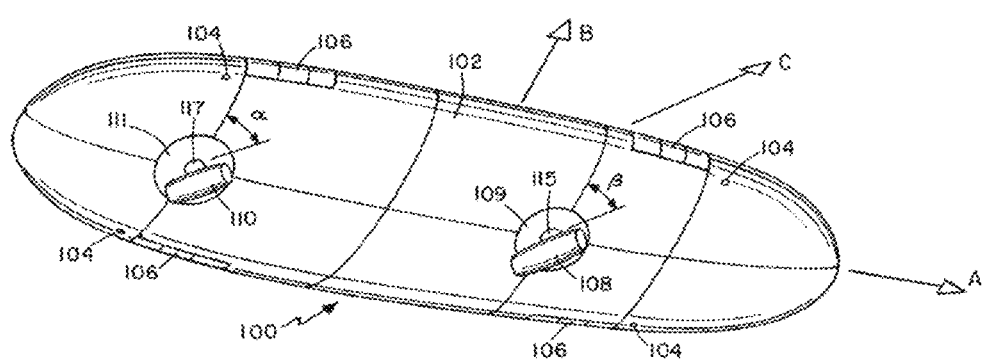
FIG. 2 is a view of an oblique wing aircraft with a pivoting wing.

FIG. 1 illustrates an aircraft with a traditional fuselage and a main wing and a horizontal stabilizer that are pivotally attached at their centers to the fuselage. This type of aircraft was viewed as having advantages over the prior swing-wing designs. The pivoting wing does not displace the center of lift relative to the center of mass of the aircraft. FIG. 2 illustrates an oblique flying wing having an elongated wing and pivoting propulsion units. This design allows for the wing to be perpendicular to the airflow direction for take-off, and for the rotation of the wing at higher speeds.

In contrast to the aforementioned examples, a multi-segment oblique wing aircraft according to embodiments of the present invention uses a long, thick, center segment that allows for the placement of pilots and passengers in the center segment, and may allow for the use of the multi-segment oblique wing aircraft as a high-speed commercial aircraft. In a certain sense, the center segment takes on the ferrying function of a traditional fuselage without the drawbacks of a traditional fuselage. Further, the separation of the outer wing segments by the long center wing segment during a highly swept high-speed flight provides excellent control authority due to the possibility to place multiple trailing edge control surfaces such that they can affect both the pitch and roll axes when their actions are properly combined. The outer wing segments are significantly thinner than the center wing segment.

Figure 3:
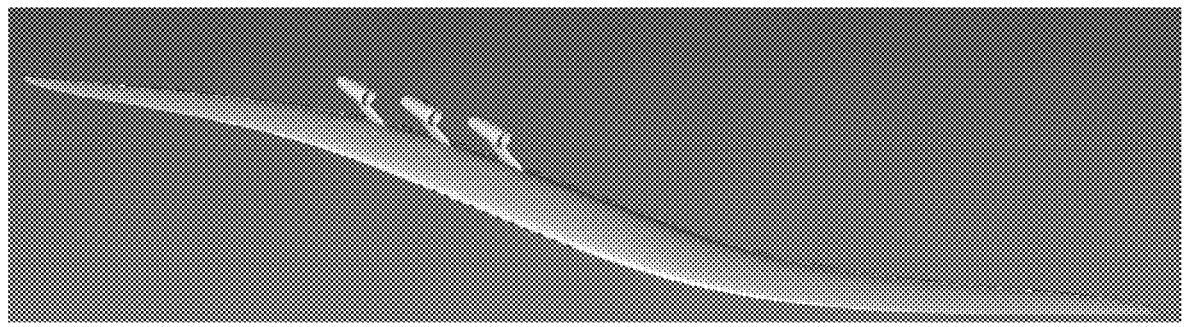
FIG. 3 is an illustration of a multi-segment oblique wing aircraft according to some embodiments of the present invention.
Figure 4:
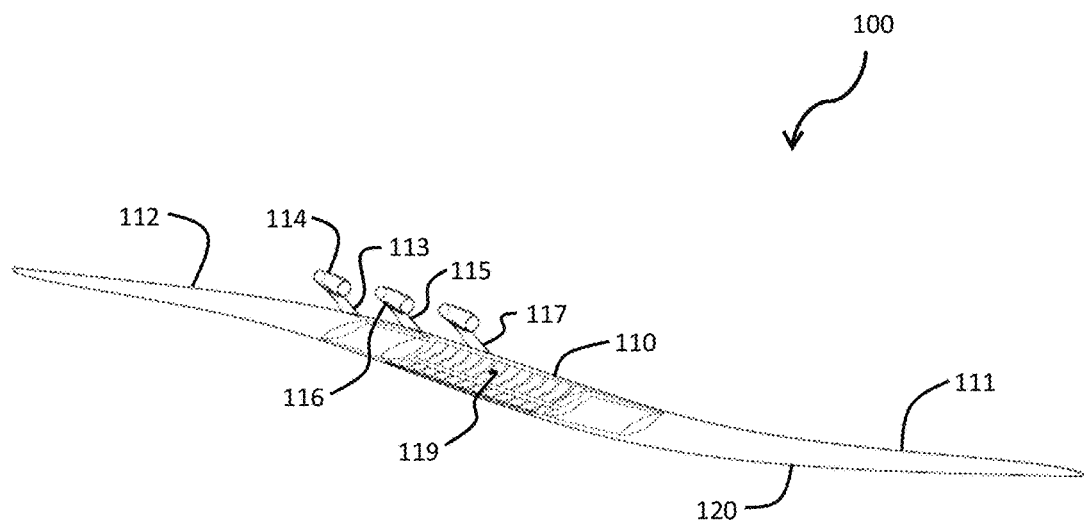
FIG. 4 is a drawing of a multi-segment oblique wing aircraft according to some embodiments of the present invention.

In some embodiments of the present invention, as seen in FIGS. 3 and 4, a multi-segment oblique wing aircraft 100 includes a center wing segment 110, a left wing segment 111, and a right wing segment 112. The center wing segment 110 is substantially thicker in the Zb direction (as defined below), and is thick enough to allow for passengers in a passenger area 118. A plurality of thrust units 114, 116, 118 may use pivoting pylons 113, 115, 117 which allow for thrusting in different forward flight configurations. The rotation of the thruster units will change the sweep of the oblique wing aircraft, both due to the change in thrust direction and also due to a rudder effect of the pylons. There may be further trimming and control surfaces and devices which assist in the sweep change.

In some embodiments of the present invention, as seen in FIGS. 5-10, a multi-segment oblique wing aircraft 200 includes a center wing segment 210, a left wing segment 212, and a right wing segment 211. The center segment 210 has a leading edge 210a and a trailing edge 210b. Although there may be variations along their lengths, the leading edge 210a and the trailing edge 210b of the center segment 210 are substantially parallel. The center segment 210 may be substantially thicker than the other segments and may be adapted to contain pilots and passengers of the aircraft. Although illustrated without propulsion units shown, it is understood the multi-segment oblique wing aircraft 200 may be powered similarly to the aircraft 100 discussed above. In some aspects, as discussed further below, the thrust units will be non-rotating thrust units, and the aircraft is adapted to take-off and cruise at a constant wing position.

The left wing segment 212 has a leading edge 212a and a trailing edge 212b. The left wing segment 212 tapers as it routes outboard from the center segment 210, in that the chord length lessens along the span of the wing segment. The left wing segment 212 may be substantially thinner in the vertical direction Zb than the center segment 210. The right wing segment 211 has a leading edge 211a and a trailing edge 211b. The right wing segment 211 tapers as it routes outboard from the center segment 210, in that the chord length lessens along the span of the wing segment. The right wing segment 211 may be substantially thinner in the vertical direction Zb than the center segment 210.

Figure 5:
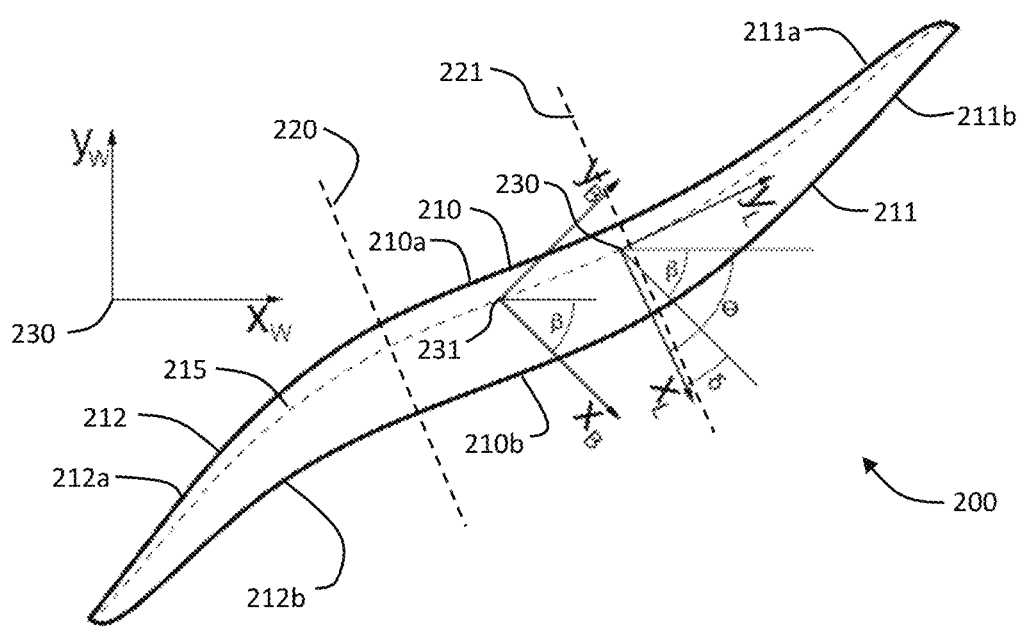
FIG. 5 illustrates coordinate systems for an oblique wing according to some embodiments of the present invention.

FIG. 5 introduces coordinate systems which illustrate aspects of the system. A prevailing wind coordinate system 230 includes the prevalent airflow across the wing as a composite of Xw and Yw, with Xw being the airflow direction seen in forward flight directly into the wind. A body coordinate system 231 is set to remain constant with the body of the wing, with the Yb axis set approximately parallel to the composite average direction of the leading edges 212a, 211a of the wings. The Zb axis of the body coordinate system comes out of the view towards the viewer. A quarter chord coordinate system 232 sets Yl as parallel to the quarter chord tangent at that point, and Xl as perpendicular to the quarter chord at that point. The body coordinate system 231 remains fixed with regard to the aircraft. The prevailing wind coordinate system 230 is a product of the environment and is independent of the wing, and the quarter chord coordinate system 232 a function of the wing design but alters relative to which point on the wing is being referenced.

The multi-segment wing may be viewed as having a transition from the left wing segment 212 to the center wing segment 210 at a reference line 220, and as having a transition from the right wing segment 211 to the center wing segment 210 at a reference line 221. Within the reference lines 220, 221, the leading edge 210a and the trailing edge 210b of the center segment 210 are substantially parallel.

Figure 7:
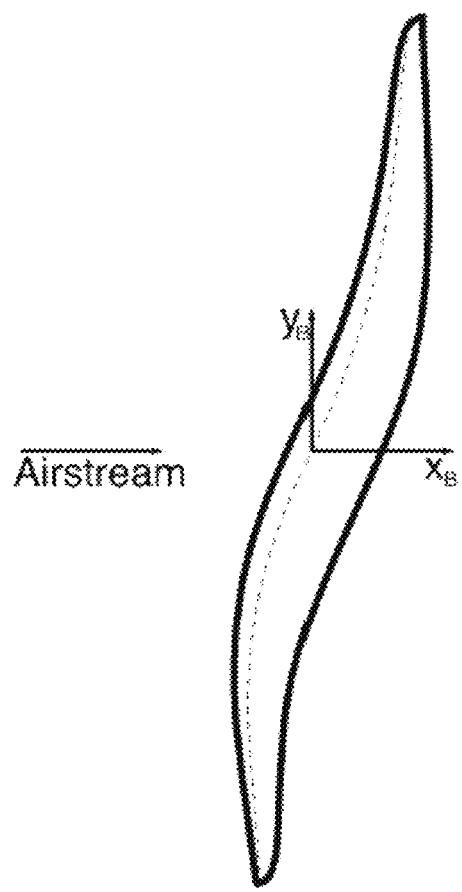
FIG. 7 is a view of an oblique wing in a take-off configuration according to some embodiments of the present invention.

An aspect of the multi-segment wing aircraft 200 is that each of the segments 210, 211, 212 may have their own critical Mach number. The critical Mach number is the ratio of speed of local wind to the speed of sound at which drag increases due to compressibility effects, and is a function of airfoil thickness, lift on the section, and the local sweep of the section. In the context of this application, sweep refers to quarter chord sweep. The goal is for all segments to have a similar critical Mach number that is slightly larger than the design Mach number of the vehicle. The center wing segment 210 is substantially thicker than the outer wing segments 211, 212 and will require more sweep for the same critical Mach number. The outer wing segments 211, 212 are thinner and will require less sweep for the same critical Mach number. FIG. 7 illustrates a take-off configuration wherein the leading edges of the wing segments are substantially perpendicular to the prevailing airflow. This may also be a low(er) speed flight configuration. This configuration maximizes the span length of the wing segments, which are predominantly perpendicular to the airflow in this take-off configuration. In contrast, the center segment is swept at an angle from the airflow direction.

Figure 8:
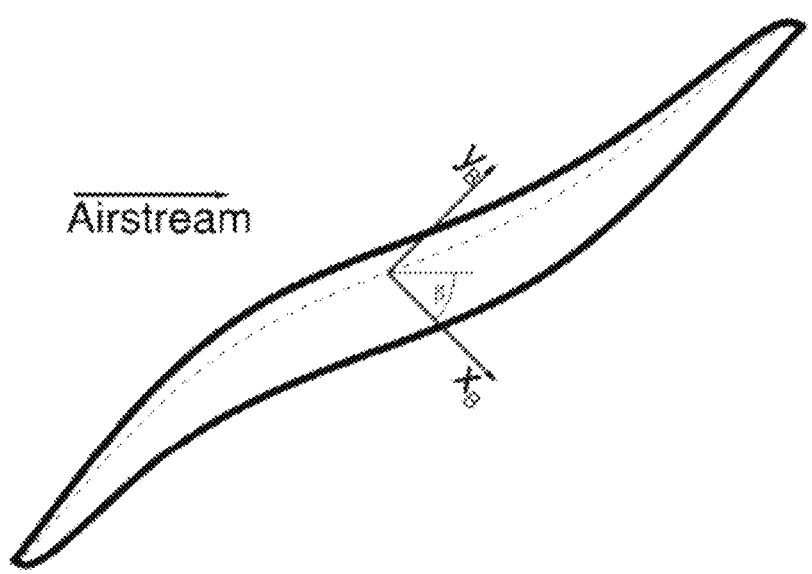
FIG. 8 is a view of an oblique wing in a high-speed configuration according to some embodiments of the present invention.

As seen in FIG. 8 in a high speed flight configuration, the multi-segment wing aircraft 200 has rotated relative to the airflow direction. In this high speed flight configuration, all segments have more sweep than in the take-off configuration. The center wing segment is more swept relative to the airflow direction than the outer wing segments. This asymmetric sweep between the center segment and the wing segments allows for a thicker middle section, which is desired in order to accommodate pilots, passengers, and other cargo. The higher sweep of the center segment reduces or eliminates the wave drag penalty associated with the increased thickness of the center segment.

Figure 9:
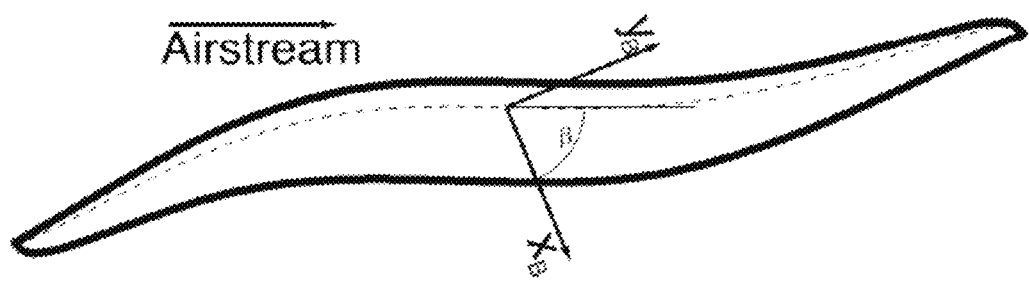
FIG. 9 is a view of an oblique wing in a fully rotated configuration according to some embodiments of the present invention.
Figure 10:
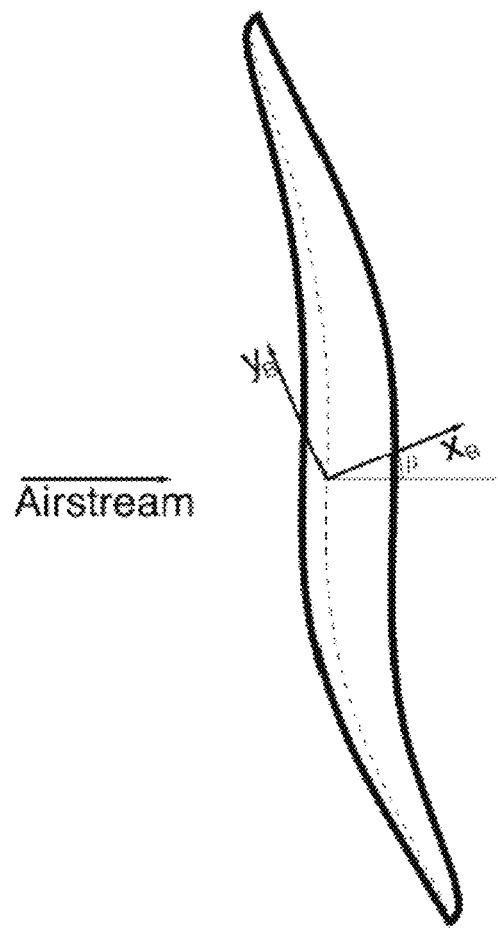
FIG. 10 is a view of an oblique wing in a configuration with the center segment perpendicular to the airflow direction according to some embodiments of the present invention.
Figure 11A:
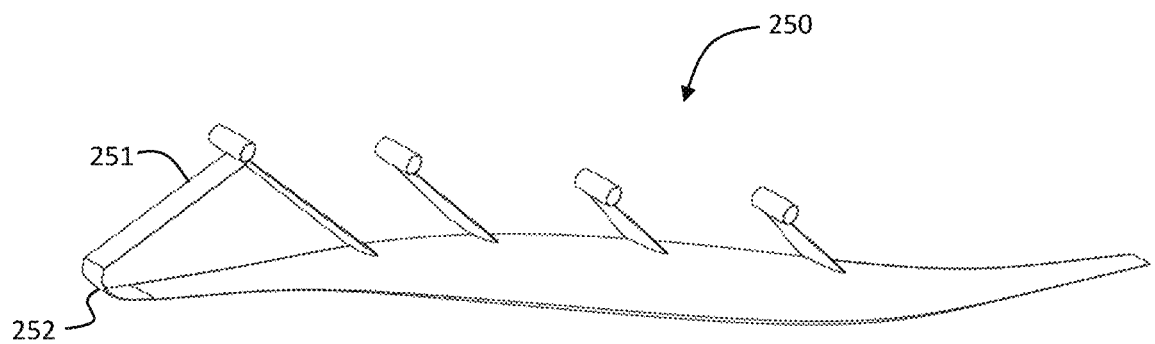
FIG. 11A is a perspective view of a fixed orientation multi-segment oblique flying wing aircraft with an outboard auxiliary control surface according to some embodiments of the present invention.
Figure 11B:
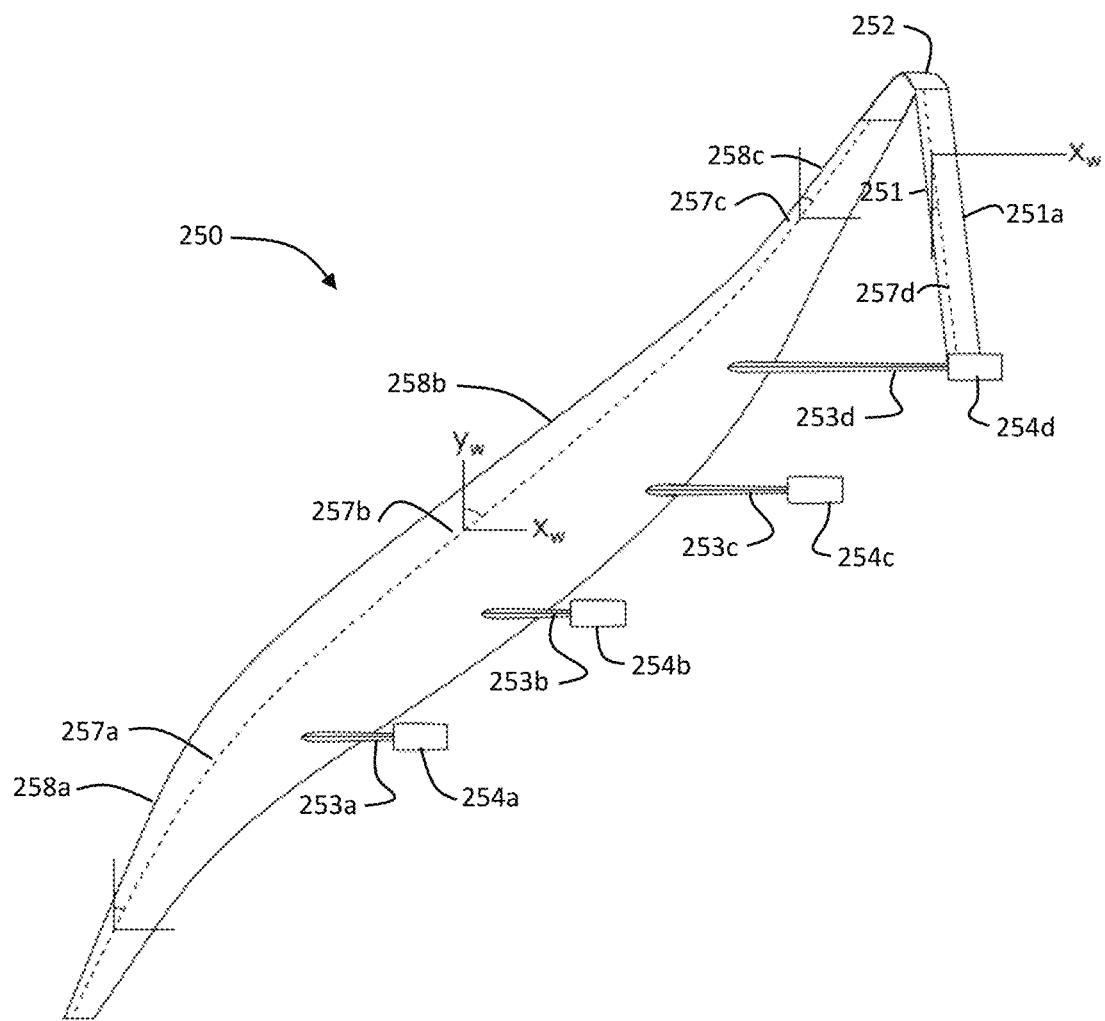
FIG. 11B is a top view of a fixed orientation multi-segment oblique flying wing aircraft with an outboard auxiliary control surface according to some embodiments of the present invention.
Figure 11C:
FIG. 11C is a side view of a fixed orientation multi-segment oblique flying wing aircraft with an outboard auxiliary control surface according to some embodiments of the present invention.
Figure 11D:
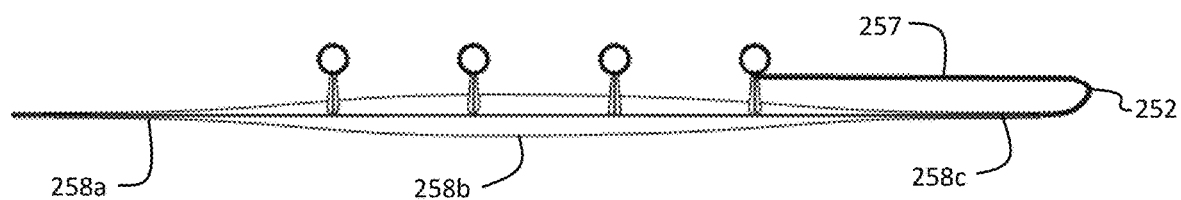
FIG. 11D is a rear view of a fixed orientation multi-segment oblique flying wing aircraft with an outboard auxiliary control surface according to some embodiments of the present invention.
Figure 12A:
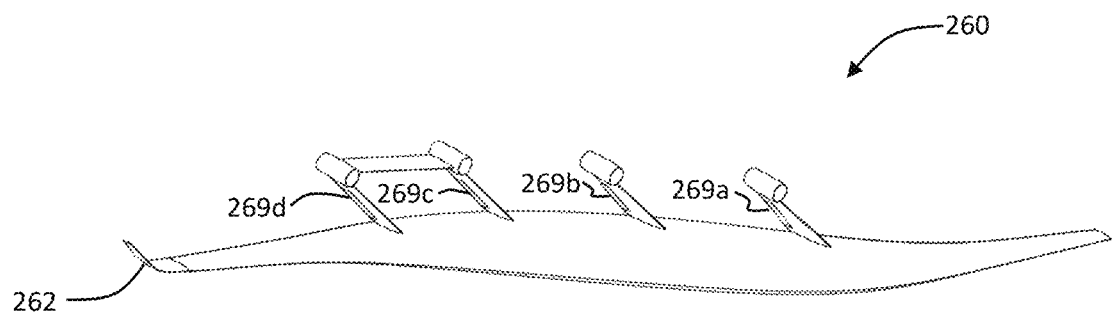
FIG. 12A is a perspective view of a fixed orientation multi-segment oblique flying wing aircraft with an inboard auxiliary control surface according to some embodiments of the present invention.
Figure 12B:
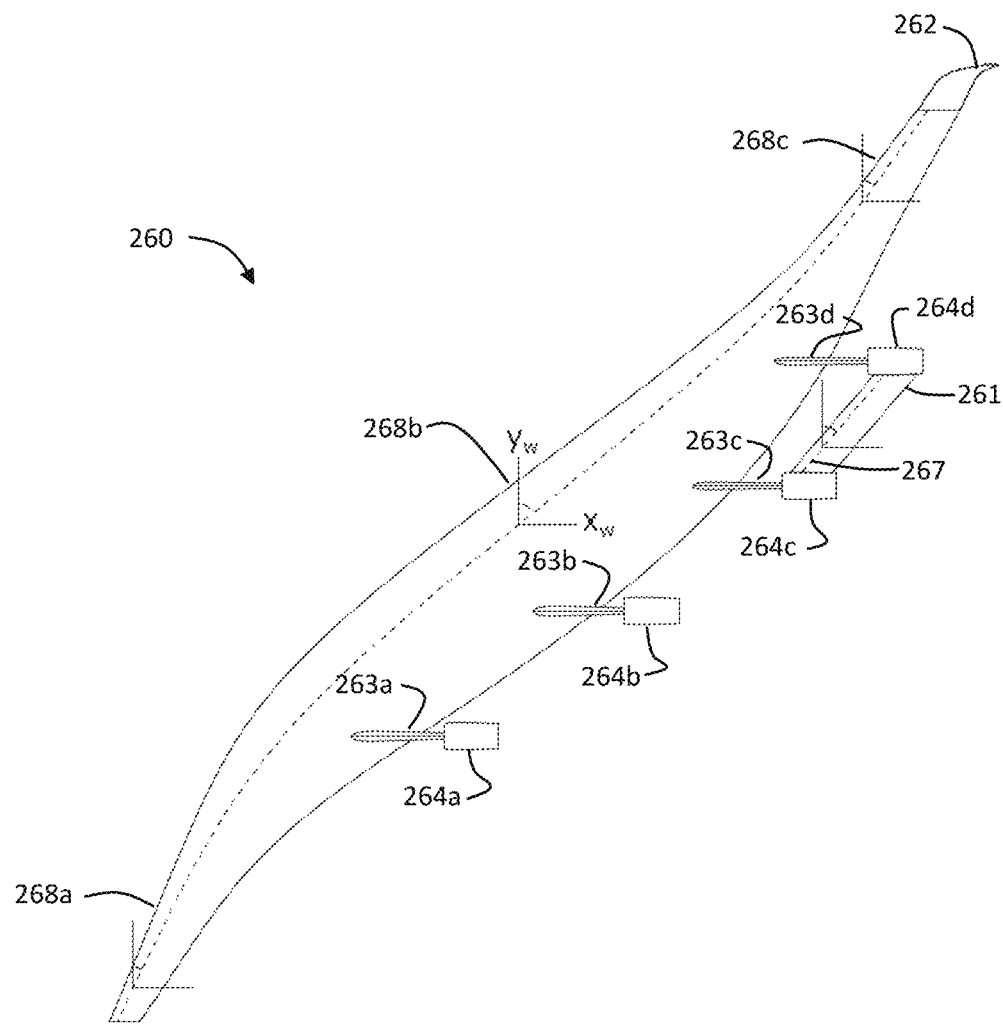
FIG. 12B is a top view of a fixed orientation multi-segment oblique flying wing aircraft with an inboard auxiliary control surface according to some embodiments of the present invention.
Figure 12C:
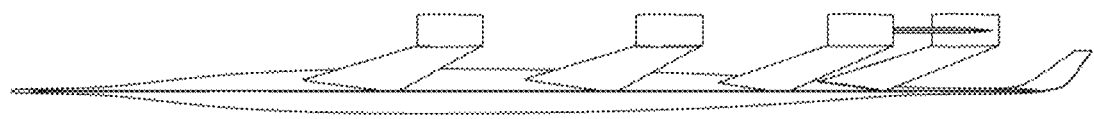
FIG. 12C is a top view of a fixed orientation multi-segment oblique flying wing aircraft with an inboard auxiliary control surface according to some embodiments of the present invention.
Figure 12D:
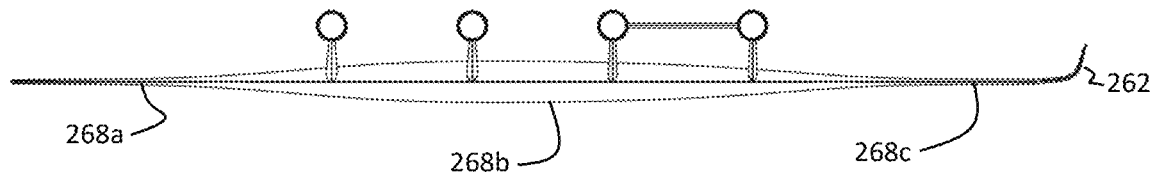
FIG. 12D is a rear view of a fixed orientation multi-segment oblique flying wing aircraft with an inboard auxiliary control surface according to some embodiments of the present invention.

FIG. 9 illustrates a most extreme case of rotation, wherein the quarter chord line of the center segment is parallel to the airstream. FIG. 10 illustrates a configuration with the leading edge of the center segment substantially perpendicular to the airflow direction.

Figure 6:
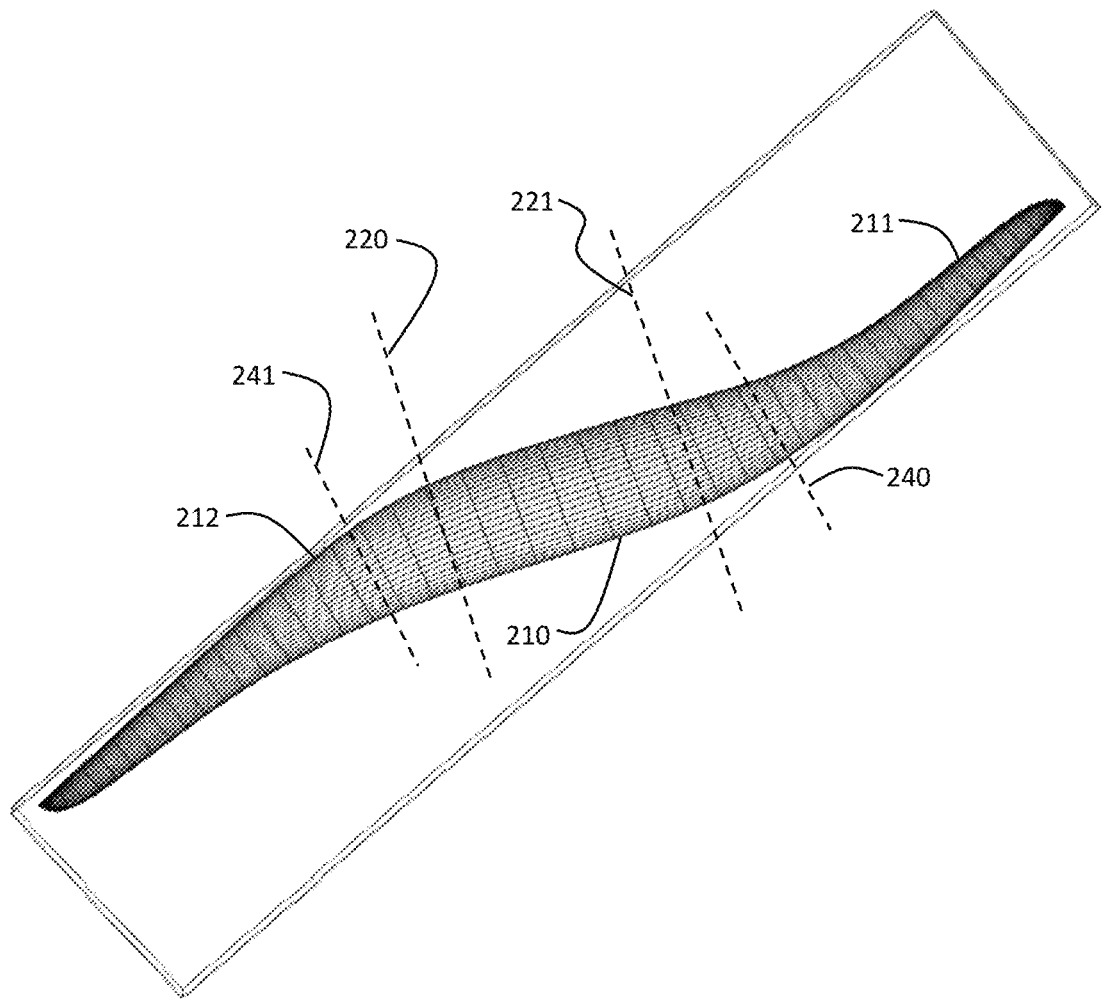
FIG. 6 illustrates wing design aspects for an oblique wing according to some embodiments of the present invention.

In some aspects, the use of the center segment as a repository for the pilots, the passengers, and other items which have volume, allows the center section to function somewhat as a fuselage of the aircraft, but without the disadvantages of a standard fuselage, while retaining advantages of an oblique wing. The thick center segment relative to the thickness of the wing segments may also be seen in that the relative thickness, defined as the ratio of the chord length to the segment thickness, is larger for the center segment relative to the wing segments. Although the wing segments may be thicker where they couple to the center segment, the wings will get much thinner in a transition region, similarly as they alter sweep through a transition region. FIG. 6 illustrates aspects of the oblique wing according to some embodiments of the present invention. As noted above, the multi-segment wing may be viewed as having a transition from the left wing segment 212 to the center segment 210 at a reference line 220, and as having a transition from the right wing segment 211 to the center segment 210 at a reference line 221. Within the reference lines 220, 221, the leading edge 210a and the trailing edge 210b of the center segment 210 are substantially parallel. The center segment 210 has an extended portion between its first end at reference line 220 and its second end at reference line 221, and in this portion the leading and trailing edges of the center segment are substantially parallel. The ratio of the chord length of the center segment to its span may be 1:4 in some aspects. In some aspects, the ratio of the chord length of the center segment to its span may be in the range of 1:3 to 1:5. In some aspects, the ratio of the chord length of the center segment to its span may be in the range of 1:2.5 to 1:4.5. In some aspects, the chord length of the center segment does not vary by more than 10% along the span of the center segment. In some aspects, the chord length of the center segment does not vary by more than 15% along the span of the center segment. In some aspects, the chord length of the center segment does not vary by more than 5% along the span of the center segment. Minimizing variation of chord length in the center section allows more or less uniform cross section of the cargo or passenger cabin, similar to the uniform cross section of a traditional passenger aircraft fuselage. The relatively constant airfoil cross section of the center section also simplifies the design of the propulsor units by reducing spanwise variation in inflow conditions. The relatively long and skinny configuration of the aircraft, where wing segments and the central section provide a joint body with a sizeable aspect ratio of length to chord, reduces wave volumetric drag of the aircraft in the supersonic regime. Combined with the increased thickness-to-chord ratio of the center segment, this range of chord and span ratios affords a good balance between aerodynamic performance and payload capacity. As can be seen in FIG. 8 in the high speed flight configuration, the center segment has significantly more sweep than the wing segments, which accommodates its higher critical Mach number relative to the wing segments, which have somewhat lower sweep in the high speed configuration. The difference in sweep between the center segment and the wing segments matches the effective critical Mach number of the segments.

Outboard of the center wing segment 210 there may be transition regions where the leading edge line of the center wing segment 210 transitions to the leading edge of the outer wing segments 211, 212. At the first end of the center wing segment 210 at reference line 220 the wing may transition until a reference line 241 wherein the leading edge of the left wing segment 212 becomes substantially linear. Within the transition area the left wing segment may curve around its leading edge to its outboard linear position. The left wing segment 212 may also taper down its chord length both within its transition area and continue to taper outboard of its transition area and out to the wingtip. At the second end of the center segment 210 at reference line 221 the wing may transition until a reference line 240 wherein the trailing edge of the right wing segment 211 becomes substantially linear. Within the transition area the right wing segment may curve around its trailing edge to its outboard linear position. The right wing segment 211 may also taper down its chord length both within its transition area and continue to taper outboard of its transition area and out to the wingtip. Both the left wing segment 212 and the right wing segment 211 are substantially thinner than the center segment 210. Although there may be variations along their lengths, the leading edge 210a and the trailing edge 210b of the center segment 210 are substantially parallel. The leadings edge 210a and the trailing edge 210b of the center segment 210 is also swept considerably more than the leading edges 211a, 212a of the wing segments 211, 212 outboard of the transition areas.

The use of a long, thick, center segment allows for the placement of pilots and passengers in the center segment, and may allow for the use of the multi-segment oblique wing aircraft as a high speed commercial aircraft. In a certain sense, the center segment takes on the ferrying function of a traditional fuselage without the drawbacks of a traditional fuselage. Further, the separation of the wings by the long center segment during a highly swept high speed flight provides excellent control authority due to the possibility to place multiple trailing edge control surfaces such that they can affect both the pitch and roll axes when their actions are properly combined. In some aspects, the ratio of the span of the center segment relative to the span of each wing is in the range of 1:1 to 3:1. The optimum ratio of thickness along the span will depend on the details of the aircraft requirements and materials, but should be designed to balance aerodynamic drag (particularly wave drag), structural weight, and payload or fuel requirements; optimum thickness ratios are likely to fall in the stated range. In some aspects, the average thickness of the center segment relative to the average thickness of the wings is in the range of 1.5:1 to 20:1. In some aspects, the ratio of the relative thickness of the center segment to the relative thickness of the wings is in the range of 1.5 to 10.

In an exemplary embodiment, the overall wingspan (lateral dimension of the aircraft with the center segment unswept) of the aircraft is 60 m, with a planform area of 240 m², with a planform aspect ratio (wingspan²/area) of 15. In this exemplary embodiment, the wing segment lengths are 18 m, each with an area of 65 m², and the center segment length is 26 m. The center segment chord is 6 m, with the wing segment root chord of 6 m, the wing segment tip chord of 1.2 m, and the wing segment mean chord of 3.6 m. The wing mean chord to body mean chord ratio is 0.6, and wing segment taper ratio is 0.2. The wing segment aspect ratio ((2*segment length)²/(2*segment area)) is 10. The effective parasitic drag ratio (the measure of how well the center segment/fuselage bridges the wing segments to reduce overall drag) ((overall span)²/(2*segment area)) is 28. In this exemplary embodiment, the forward wing segment ¼ chord sweep is −5 degrees in the take-off configuration, with the center segment ¼ chord sweep at 25 degrees, and the rear wing segment ¼ chord sweep at 5 degrees.

In some aspects, the overall wingspan is in the range of 5 m to 200 m. In some aspects, the aircraft planform area is in the range of 1 m² to 3000 m². In some aspects, the aircraft planform aspect ratio is in the range of 5 to 30. In some aspects, the wing segment length is in the range of 2 m to 50 m. In some aspects, the center segment length is in the range of 2 m to 80 m. In some aspects, the center segment chord is in the range of 0.5 m to 30 m. In some aspects, the wing segment root chord is in the range of 0.5 m to 30 m. In some aspects, the wing segment tip chord is in the range of 0.1 m to 20 m. In some aspects, the wing segment mean chord is in the range of 0.3 m to 25 m. In some aspects, the wing mean chord to center segment mean chord ratio is in the range of 0.1 to 1. In some aspects, the wing segment taper ratio is in the range of 0 to 1. In some aspects, the wing segment area is in the range of 0.2 m² to 1000 m². In some aspects, the effective parasitic drag ratio is in the range of 10 to 50. In some aspects, forward wing segment quarter chord sweep is in the range of −20 to 20 degrees in the take-off configuration, with the center segment quarter chord sweep in the range of 10 to 70 degrees, and the rear wing segment quarter chord sweep in the range of −20 to 20 degrees.

In some aspects, embodiments of the present invention may benefit from adding more pitch authority than the flying wing alone, depending on the details of the control surface layout and wing planform design. In some aspects, the multi-segment oblique flying wing aircraft is adapted to take-off, land, and cruise in the same swept configuration/orientation.

In another embodiment of the present invention, as seen in FIGS. 11A-D, a multi-segment oblique wing aircraft 250 adapted for take-off, land, and cruise in the same swept configuration/orientation has a wing 258 with a left outer wing segment 258a, a center wing segment 258b, and a right side outer wing segment 258c, with their respective quarter chord lines 257a, 257b, 257c. The oblique wing characteristics, and ranges of parameters, may be as discussed with regard to the earlier embodiment 200, above. With the aircraft 250, which does not rotate after take-off, the forward wing, the sweep of the wing segments remains constant during different flight modes. The forward sweep of the leading outer wing segment may be 25 degrees. In some aspects, the forward sweep of the leading outer wing segment may be in the range of 15 to 35 degrees. In some aspects, the forward sweep of the leading outer wing segment may be in the range of 0 to 60 degrees. The rearward sweep of the trailing outer wing segment may be 35 degrees. In some aspects, the rearward sweep of the trailing outer wing segment may be in the range of 25 to 45 degrees. In some aspects, the rearward sweep of the trailing outer wing segment may be in the range of 0 to 60 degrees. The sweep of the center wing segment may be 50 degrees. In some aspects, the sweep of the center wing segment may be in the range of 35 to 65 degrees. In some aspects, the sweep of the center wing segment may be in the range of 25 to 75 degrees. The aircraft 250 may have a plurality of thrust elements, and may have four thrust elements nacelles 254a, 254b, 254c, 254d, coupled to pylons 253a, 253b, 253c, 253d. The right outer wing segment 258c may have a winglet 252, and has an auxiliary pitch control surface 251 which extends from the winglet 252 to either the outboard propulsor nacelle 254d (as-drawn), or the outboard propulsor pylon 253d. Such an arrangement may reduce the structural weight of the stabilizing surface 253d by forming multiple structural load paths, may reduce the aerodynamic coupling between pitch control input and roll, and may delay stall of the right wingtip. The auxiliary control surface 251 may include a controllable control surface along its trailing edge. In some aspects, the entire auxiliary control surface 251 may be rotatable as a controllable control surface.

In some aspects, the propulsor pylons 253a, 253b, 253c, 253d may be of different geometries in order to increase or decrease the quarter-chord 257d sweep of the auxiliary pitch control surface 251. In an exemplary embodiment, the right most pylon 253d may be extended to increase the sweep of the pitch control surface 251. In some aspects, the thrust elements nacelles 254a, 254b, 254c, 254d may have different geometries to account for non-uniform flow conditions introduced by the auxiliary pitch control surface 251.

In another embodiment of the present invention, as seen in FIGS. 12A-D, a multi-segment oblique wing aircraft 260 adapted for take-off, land, and cruise in the same swept configuration/orientation has a wing 268 with a left outer wing segment 268a, a center wing segment 268b, and a right side outer wing segment 268c, with their respective quarter chord lines 267a, 267b, 267c. The oblique wing characteristics, and ranges of parameters, may be as discussed with regard to the earlier embodiment 200, above. With the aircraft 260, which does not rotate after take-off, the forward wing, the sweep of the wing segments remains constant during different flight modes. The forward sweep of the leading outer wing segment may be 25 degrees. In some aspects, the forward sweep of the leading outer wing segment may be in the range of 15 to 35 degrees. In some aspects, the forward sweep of the leading outer wing segment may be in the range of 0 to 60 degrees. The rearward sweep of the trailing outer wing segment may be 35 degrees. In some aspects, the rearward sweep of the trailing outer wing segment may be in the range of 25 to 45 degrees. In some aspects, the rearward sweep of the trailing outer wing segment may be in the range of 0 to 60 degrees. The sweep of the center wing segment may be 50 degrees. In some aspects, the sweep of the center wing segment may be in the range of 35 to 65 degrees. In some aspects, the sweep of the center wing segment may be in the range of 25 to 75 degrees. The aircraft 260 may have a plurality of thrust elements, and may have four thrust elements nacelles 264a, 264b, 264c, 264d, coupled to pylons 263a, 263b, 263c, 263d. The right outer wing segment 268c may have a winglet 262.

The aircraft 260 has an auxiliary pitch control surface 261 supported by two or more propulsor pylons 263c, 263d or propulsor nacelles (as-drawn) 264c, 264d. Such an arrangement reduces the structural weight of the supporting structure for the auxiliary pitch control surface 261 by using the existing propulsor pylon structure. The propulsor pylons 263a, 263b, 263c, 263d and/or nacelles 264a, 264b, 264c, 264d may have different geometries to position the auxiliary pitch control surface as desired, for example, to increase or decrease the quarter-chord sweep 267 of the auxiliary pitch control surface 261, or to account for nonuniform propulsor inflow conditions. The auxiliary control surface 261 may include a controllable control surface along its trailing edge. In some aspects, the entire auxiliary control surface 261 may be rotatable as a controllable control surface.

In some aspects, the multi-segment oblique flying wing aircraft may include rudder-like yaw control surfaces 269a, 269b, 269c, 269d on propulsor pylon surfaces. Whether or not the propulsor pylons include control surfaces, the pylons generally may serve the function of increasing lateral directional stability as a vertical fin might in a conventional aircraft design.

Figure 13A:
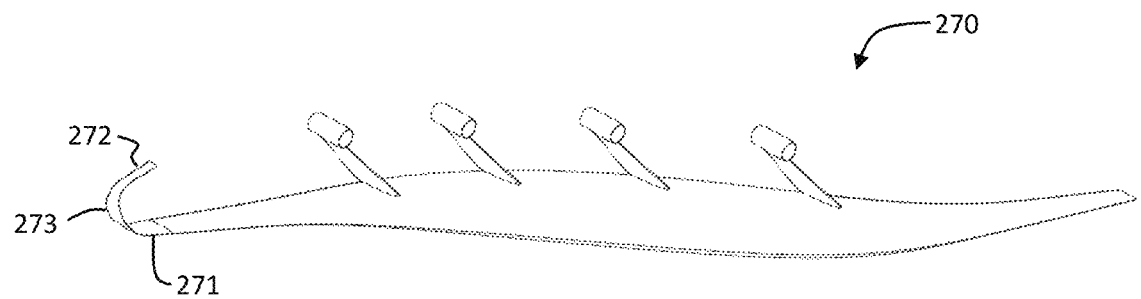
FIG. 13A is a perspective view of a fixed orientation multi-segment oblique flying wing aircraft with a winglet auxiliary control surface according to some embodiments of the present invention.
Figure 13B:
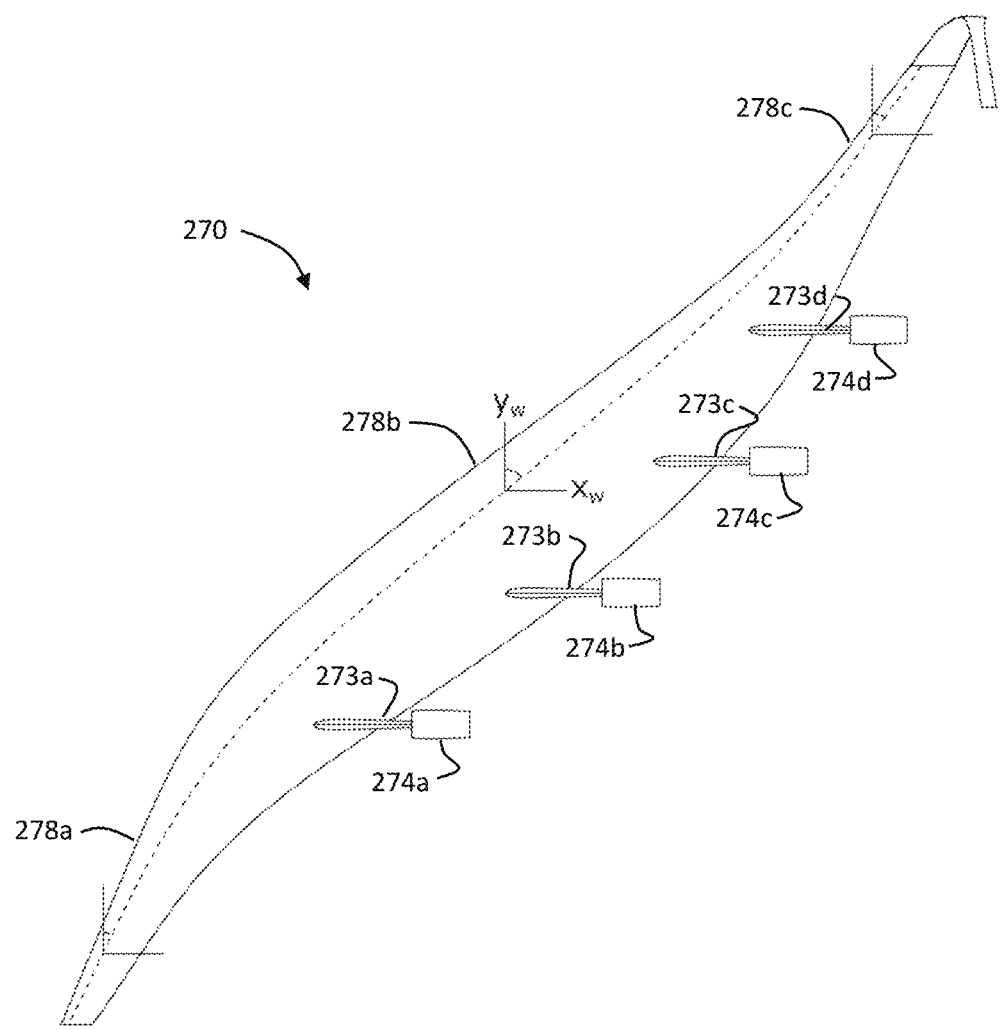
FIG. 13B is a top view of a fixed orientation multi-segment oblique flying wing aircraft with a winglet auxiliary control surface according to some embodiments of the present invention.
Figure 13C:
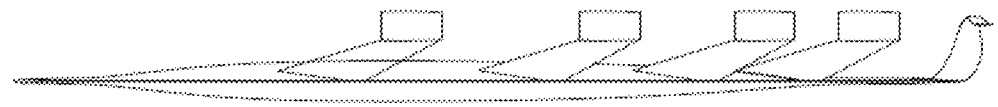
FIG. 13C is a side view of a fixed orientation multi-segment oblique flying wing aircraft with a winglet auxiliary control surface according to some embodiments of the present invention.
Figure 13D:
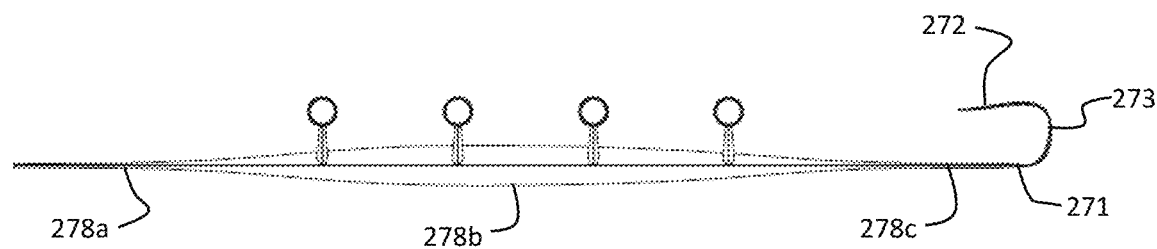
FIG. 13D is a rear view of a fixed orientation multi-segment oblique flying wing aircraft with a winglet auxiliary control surface according to some embodiments of the present invention.
Figure 13E:
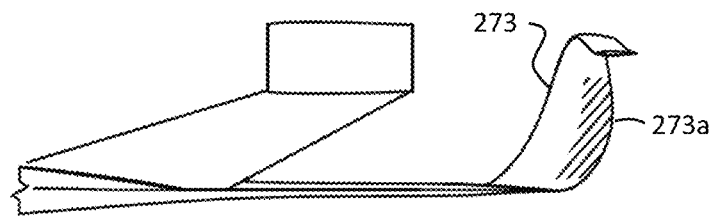
FIG. 13E is a side view of a fixed orientation multi-segment oblique flying wing aircraft with a winglet auxiliary control surface according to some embodiments of the present invention.
Figure 13F:
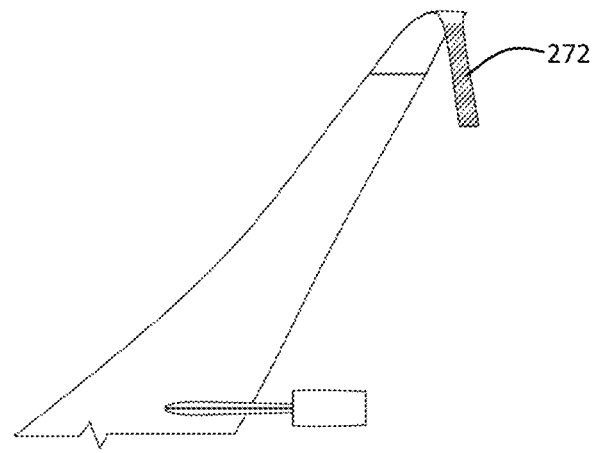
FIG. 13F is a top view of a fixed orientation multi-segment oblique flying wing aircraft with a winglet auxiliary control surface according to some embodiments of the present invention.

In another embodiment of the present invention, as seen in FIGS. 13E-F, a multi-segment oblique wing aircraft 270 adapted for take-off, land, and cruise in the same swept configuration/orientation has a wing 278 with a left outer wing segment 278a, a center wing segment 278b, and a right side outer wing segment 278c, with their respective quarter chord lines 277a, 277b, 277c. The oblique wing characteristics, and ranges of parameters, may be as discussed with regard to the earlier embodiment 200, above. With the aircraft 270, which does not rotate after take-off, the sweep of the wing segments remains constant during different flight modes. The forward sweep of the leading outer wing segment may be 25 degrees. In some aspects, the forward sweep of the leading outer wing segment may be in the range of 15 to 35 degrees. In some aspects, the forward sweep of the leading outer wing segment may be in the range of 0 to 60 degrees. The rearward sweep of the trailing outer wing segment may be 35 degrees. In some aspects, the rearward sweep of the trailing outer wing segment may be in the range of 25 to 45 degrees. In some aspects, the rearward sweep of the trailing outer wing segment may be in the range of 0 to 60 degrees. The sweep of the center wing segment may be 50 degrees. In some aspects, the sweep of the center wing segment may be in the range of 35 to 65 degrees. In some aspects, the sweep of the center wing segment may be in the range of 25 to 75 degrees. The aircraft 270 may have a plurality of thrust elements, and may have four thrust elements nacelles 274a, 274b, 274c, 274d, coupled to pylons 273a, 273b, 273c, 273d.

The multi-segment oblique wing aircraft 270 has a C-shaped winglet device 271. The winglet device 271 comprises a generally vertical aerodynamic surface 273 connected to a generally horizontal aerodynamic surface 272 with appropriate aerodynamic blends between the two surfaces and the wing structure. Such a winglet device may decrease induced drag and provide additional longitudinal and lateral stability for the overall aircraft. Certain embodiments of the present invention may include a horizontal surface 272 outfitted with an actuator in order to provide auxiliary pitch control authority, and the vertical surface 273 may be outfitted with a movable trailing edge structure 273a to provide additional yaw control authority.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. An aerial vehicle, said aerial vehicle comprising an oblique flying wing, said oblique flying wing comprising:
  a center wing segment, said center wing segment comprising a leading edge and a trailing edge, said leading edge and said trailing edge parallel within 10 degrees along their length;
  a forward wing segment, said forward wing segment coupled to a first end of said center segment, said forward wing segment comprising a leading edge and a trailing edge, wherein the spanwise average of the quarter chord of said forward wing segment is swept more than 10 degrees differently than the spanwise average of the quarter chord of the center wing segment;
  a rear wing segment, said rear wing segment coupled to a second end of said center segment, said rear wing segment comprising a leading edge and a trailing edge, wherein the spanwise average of the quarter chord of said rear wing segment is swept more than 10 degrees differently than said spanwise average of the quarter chord of the center wing segment;
  and
  a plurality of thrust elements coupled to said oblique flying wing, wherein at least one of said thrust elements resides above the top surface of said center wing segment of said oblique flying wing.

2. The aerial vehicle of claim 1 wherein said center wing segment further comprises a passenger compartment within said center wing segment.

3. The aerial vehicle of claim 1 wherein the chord length of the center segment does not vary by more than 5% along the span of the center segment.

4. The aerial vehicle of claim 1 wherein the chord length of the center segment does not vary by more than 10% along the span of the center segment.

5. The aerial vehicle of claim 1 wherein the chord length of the center segment does not vary by more than 15% along the span of the center segment.

6. The aerial vehicle of claim 2 wherein the chord length of the center segment does not vary by more than 5% along the span of the center segment.

7. The aerial vehicle of claim 2 wherein the chord length of the center segment does not vary by more than 10% along the span of the center segment.

8. The aerial vehicle of claim 2 wherein the chord length of the center segment does not vary by more than 15% along the span of the center segment.

9. The aerial vehicle of claim 1 wherein the ratio of the relative thickness of the center wing segment to the relative thickness of the outer wing segments in in the range of 1.5 to 10.

10. The aerial vehicle of claim 2 wherein the ratio of the relative thickness of the center wing segment to the relative thickness of the outer wing segments in in the range of 1.5 to 10.

11. The aerial vehicle of claim 3 wherein the ratio of the relative thickness of the center wing segment to the relative thickness of the outer wing segments in in the range of 1.5 to 10.

12. The aerial vehicle of claim 4 wherein the ratio of the relative thickness of the center wing segment to the relative thickness of the outer wing segments in in the range of 1.5 to 10.

13. The aerial vehicle of claim 5 wherein the ratio of the relative thickness of the center wing segment to the relative thickness of the outer wing segments in in the range of 1.5 to 10.

14. The aerial vehicle of claim 1 wherein said forward wing segment is forward swept in the range of 0 to 60 degrees, and wherein said center wing segment is swept in the range of 25 to 75 degrees, and wherein said rear wing segment is rearward swept in the range of 0 to 60 degrees, while in a cruise configuration.

15. The aerial vehicle of claim 2 wherein said forward wing segment is forward swept in the range of 0 to 60 degrees, and wherein said center wing segment is swept in the range of 25 to 75 degrees, and wherein said rear wing segment is rearward swept in the range of 0 to 60 degrees, while in a cruise configuration.

16. The aerial vehicle of claim 3 wherein said forward wing segment is forward swept in the range of 0 to 60 degrees, and wherein said center wing segment is swept in the range of 25 to 75 degrees, and wherein said rear wing segment is rearward swept in the range of 0 to 60 degrees, while in a cruise configuration.

17. The aerial vehicle of claim 4 wherein said forward wing segment is forward swept in the range of 0 to 60 degrees, and wherein said center wing segment is swept in the range of 25 to 75 degrees, and wherein said rear wing segment is rearward swept in the range of 0 to 60 degrees, while in a cruise configuration.

18. The aerial vehicle of claim 5 wherein said forward wing segment is forward swept in the range of 0 to 60 degrees, and wherein said center wing segment is swept in the range of 25 to 75 degrees, and wherein said rear wing segment is rearward swept in the range of 0 to 60 degrees, while in a cruise configuration.

19. The aerial vehicle of claim 1 wherein said aerial vehicle further comprises:
   a plurality of pylons coupled to said oblique flying wing; and
   the plurality of thrust elements being coupled to said pylons.

* * * * *